March 3, 1970     H. E. SEELEY, JR     3,498,279
FUEL VAPORIZER FOR INTERNAL COMBUSTION ENGINES
Filed March 4, 1968     2 Sheets-Sheet 1
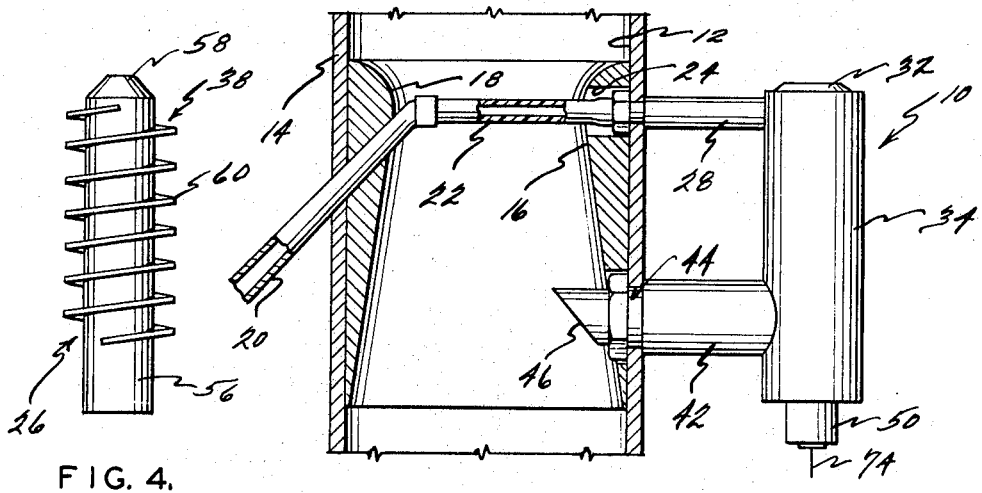
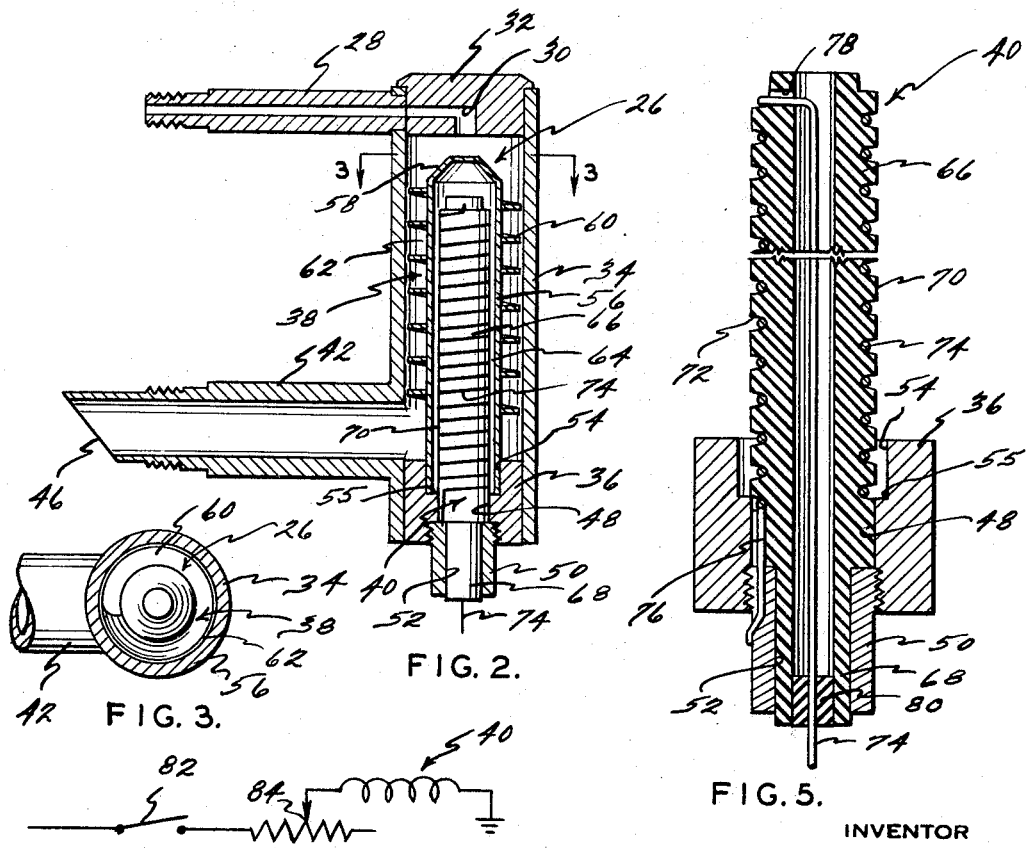
INVENTOR
HARVEY E. SEELEY, JR.
ATTORNEYS

United States Patent Office 3,498,279
Patented Mar. 3, 1970

3,498,279
FUEL VAPORIZER FOR INTERNAL COMBUSTION ENGINES
Harvey E. Seeley, Jr., 1300 Emporia St., Aurora, Colo. 80010
Filed Mar. 4, 1968, Ser. No. 709,973
Int. Cl. F02m 31/04, 31/08; B60l 1/02
U.S. Cl. 123—122                      15 Claims

ABSTRACT OF THE DISCLOSURE

This invention relates to a miniature fuel vaporizer for internal combustion engines that takes raw fuel from the fuel pump and preheats it on a continuous basis to a temperature at which it vaporizes prior to its being introduced into the intake of the fuel combustion system of the engine. Two versions of the unit are encompassed in the instant application, the first an electrically-operated heater powered by the vehicle's 12 v. ignition system and the second being a gas-heated exchanger wherein the hot gaseous products of combustion in the exhaust manifold are bypassed through the unit in heat-exchange relation to the raw fuel. Both versions incorporate a spirally-finned heat-transfer element, the electrical type being a closed system containing a resistance heating element inside thereof, whereas the hot gas type is an open system wherein the exhaust gases are continuously passed therethrough.

---

Many attempts have been made in the past to increase the combustion efficiency in an internal combustion engine, some of which have taken the form of redesigned carburetors, while the majority thereof have approached the problem from the standpoint of atomizing the raw fuel into minute droplets prior to introducing same into the carburetor jets which, it is generally acknowledged, does not break up the fuel completely into droplet form thus resulting in a significant proportion of the raw fuel passing through the system unburned.

It has now been determined in accordance with the teaching of the instant invention that much improved combustion and greater overall efficiency can be achieved through the simple, but unobvious, expedient of passing the raw fuel over the hot surface of a specially-designed miniature spiral-finned heat-transfer unit that continuously vaporizes the fuel immediately prior to its being introduced into the intake of a standard internal combustion engine carburetor or directly into the cylinders of a diesel engine. The electrically-heated version has a hollow cylindrical casing mounted alongside the carburetor with an intake orifice at the upper end thereof that receives the raw fuel from the fuel pump and allows it to gravitate down over the spiral fins of the hot heat-transfer element mounted therein before being discharged in the gaseous state directly into the throat of the carburetor. The heat-transfer element fits up inside the casing leaving an annular space therebetween containing the spiral heat-transfer fins that form a helicoidal flighting around a second upstanding hollow cylindrical member closed at its upper end. Inside the latter cylindrical member is a heater in the form of a ceramic rod wound with a resistance heating element connected to the vehicle's electrical system through a sealed plug at the lower end thereof. A rheostat is preferably connected into the electrical circuit to vary the current to the heating element.

In the gas-heated version, the outer fuel chamber remains much the same but, instead of an electrically-operated resistance heating element within the heat-transfer unit, hot exhaust manifold gases are piped from the exhaust manifold into the lower end of the spirally-finned tube and fed in countercurrent flow relation to the fuel passing down the outside thereof before being discharged back into the exhaust system from the top of the heat-exchanger thus formed. The construction and location of the discharge tube within the exhaust manifold is such that the exhaust gases passing thereover create a moderate vacuum capable of sucking the cool exhaust gases from the exchanger.

It is, therefore, the principal object of the present invention to provide a novel fuel vaporizer for internal combustion engines that completely vaporizes the raw fuel in a miniature spirally-finned heater prior to introducing same into the combustion system.

A second objective of the invention herein disclosed and claimed is to provide a fuel vaporization system for engines of the internal combustion type that brings about substantially increased fuel combustion as well as a significant increase in overall operating efficiency.

Another object is to provide a miniaturized electrically- or gas-operated spirally-finned heater for internal combustion engine fuel vaporization.

Still another objective is the provision of a gas-heated heat-exchanger that uses the exhaust manifold combustion gases as a source of heat to vaporize the raw fuel entering the combustion system.

An additional object of the invention forming the subject matter hereof is to provide an electrically-operated heat-transfer unit containing a sealed resistance heating element energized from the vehicle's electrical system.

A further object is to provide an improved fuel vaporization system for internal combustion engines that is safe, reliable, relatively inexpensive, easy to install, efficient, compact, trouble-free and readily adapted for use in most carburetion or fuel injection systems with only minor modification of existing components.

Other objects will be in part apparent and in part pointed out specifically hereinafter in connection with the description of the drawings that follows, and in which:

FIGURE 1 is a side elevation, portions of which have been shown in diametrical section, illustrating the electrically-energized resistance-type heater of the instant invention mounted at the intake of an internal combustion engine carburetor;

FIGURE 2 is a diametrical section to an enlarged scale showing the electrical version of the heat-transfer element;

FIGURE 3 is a horizontal section taken along line 3—3 of FIGURE 2, portions of the outlet tube thereof having been broken away to conserve space;

FIGURE 4 is an elevation to the same scale as FIGURE 1 showing the spirally-finned heat-transfer element by itself;

FIGURE 5 is a still further enlarged diametrical section, portions of which have been broken away to conserve space, showing the ceramic core, resistance winding and plug of the electrically-energized heat-transfer element;

Figure 7:
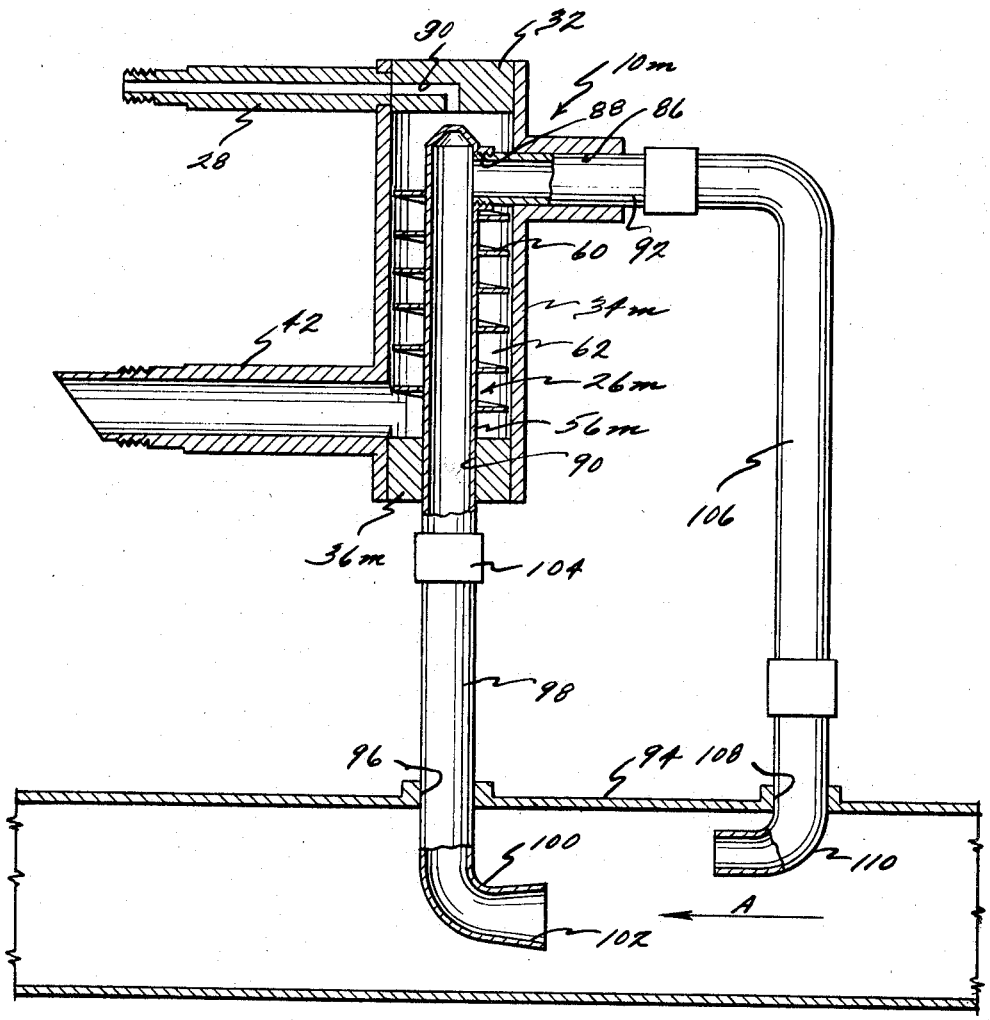

FIGURE 6 is a schematic electrical diagram showing the resistance heating element wired into the ignition circuit and containing a rheostat to control the current delivered to the heat-transfer unit; and, FIGURE 7 is a side elevation showing the gas-heated version of the fuel vaporizer connected into the exhaust manifold of an internal combustion engine, substantial portions of the assembly having been broken away and shown in diametrical section to more clearly reveal the interior construction.

Referring now to the drawings for a detailed description of the present invention and, initially, to FIGURE 1 for this purpose, reference numeral 10 has been selected to designate the electrically-heated version of the engine fuel vaporizer in a general way, and it will be seen mounted on the portion of the barrel 12 of a conventional downdraft carburetor 14 that houses the venturi 16. Air sucked down across the throat 18 of the venturi past the throttle valve (not shown) ordinarily pulls raw fuel into the carburetor through raw fuel inlet tube 20 from an adjoining fuel reservoir (also not shown) wherein the fuel level is maintained constant by a float valve. Tube 20, in the present instance, does not deliver the raw fuel directly to the throat of the venturi to be atomized by the fast-flowing air stream but, instead, delivers same to a small bypass tube 22 which passes clear through the barrel of the carburetor and emerges from the other side thereof at port 24. Now, tube 22, in the particular arrangement shown, performs a very important function, namely, that of a preheater for the raw fuel preparatory to delivering same to the prime heater that has been broadly designated by reference numeral 26. In other words, as will be shown presently, the fuel is ultimately delivered into the venturi of the carburetor in the form of a hot vapor after it leaves the prime heater; therefore, this hot vapor, even though it is sucked out the bottom of the carburetor almost instantaneously by the fast-flowing air stream moving through the venturi, manages to transfer some of its heat to the carburetor walls and also to tube 22 which is carrying the raw fuel in the liquid state. As a result, the fuel is prewarmed prior to entering the outboard prime heater 26, and the net effect is to provide a main or prime heater with a finned heat-transfer unit and a preheater in the form of a simple heat-exchanger. It is also significant to note that the heated surfaces of the carburetor are transferring heat to the incoming combustion air at the same time it is being intermixed with the hot fuel vapors and this, also, contributes significantly to the overall combustion efficiency. Accordingly, while it is possible to deliver the raw fuel directly to prime heater 26 without preheating it and still have a much improved carburetor system, the above-described arrangement is preferred for those internal combustion engines having a carburetor. Of course, in diesel engines and the like that have no carburetor but, rather, inject the fuel under high pressure directly into the cylinders, it is not possible to prewarm the fuel in this manner.

Referring next to both FIGURES 1 and 2, it will be seen that prewarmed raw fuel leaving the carburetor is fed into the top of prime heater 26 by means of a small-bore delivery tube 28 that receives fuel from preheater 22 and passes same into the intake port 30 provided in the head 32 of said main heater unit. This head 32 is fastened securely in the top of hollow cylindrical element 34 that comprises the outer envelope or housing for the prime heater 26. The bottom of element 34 is closed by plug 36 to which is fastened the spiral-finned heat-transfer element that has been generally designated by reference numeral 38 as well as the heater element that has been similarly referred to by numeral 40. The hot vaporized fuel leaves the bottom of the prime heater through a large-bore discharge tube 42 that is, in turn, connected back into the barrel of the carburetor immediately beneath the throat of the venturi. A side-opening port 44 is provided in the barrel of the carburetor to receive the outlet end of discharge tube 42 as shown in FIGURE 1. The latter end of the discharge tube is cut on the bias as shown at 46 to provide an overhanging shield-like projection that enables the hot fuel vapors to escape freely therefrom into the air stream moving thereacross.

Next, reference will be made to FIGURES 2, 3 and 4 for a detailed description of the spiral-finned heat-transfer element 38. Plug 36 in the bottom of outer hollow cylindrical housing 34 has an axial bore 48 therethrough which is threaded at its lower extremity to receive a second smaller externally-threaded plug 50 that mounts the resistance heating element 40 within its axial bore 52. Plug 36 has a counterbore 54 in the top thereof that cooperates with bore 48 to define an annular shoulder 55 upon which the lower end of the heat-transfer element 38 sits.

Heat-transfer element 38 comprises an elongate hollow cylindrical member 56 fabricated from a material such as brass having good heat-conductive properties, a cap 58 closing the upper end of said member which may be integral as illustrated or a separate piece, and a spiral fin 60 of helicoidal configuration extending from the top of the cylindrical member to a point of termination just short of the entrance to discharge tube 42. In the particular form shown, the helicoidal flighting that forms the spiral fin 60 of the heat-transfer element has been shown formed from a separate ribbon of material; however, if this construction is used, the fin must be welded or brazed to member 56 so as to provide a substantially uninterrupted heat-conductive joint that will withstand temperatures well in excess of those at which lead, and even silver, solder would melt. Otherwise, the preferred method of fabricating the fins 60 would be to machine same integral with member 56 out of a single brass rod. The best results have been obtained by making the fins of substantial thickness, say $\frac{1}{64}$ of an inch or thereabouts.

The outside diameter of hollow cylindrical member 56 is, of course, substantially less than the inside diameter of heat-exchanger housing 34 so as to leave an annular fuel-flow space 62 therebetween for the circulation of the fuel being heated and vaporized. Fins 60, on the other hand, have a width or radial dimension substantially equal to the radial distance separating the adjacent surfaces of elements 34 and 56 so as to bridge annular space 62 therebetween and cause the fuel to migrate spirally down along the fin 60 where vaporization thereof takes place.

The diameter of counterbore 54 is such as to receive the cylindrical member 56 with a relatively tight fit so the latter can be sealed therein and prevent both the liquid and vapor fractions within the exchanger from leaking into the heater element cavity 64 inside said hollow cylindrical member. The atmosphere inside member 56 where the resistance heating element is housed is preferably one that is substantially devoid of oxygen and, therefore, will not support combustion.

The resistance heating element 40 is most clearly revealed in FIGURES 4 and 5 to which specific reference will now be made. It comprises a hollow ceramic core 66 that has a section 68 of reduced diameter on the lower end thereof that fits tightly within the axial bore 52 of smaller plug 50 where it is sealed. The outer cylindrical surface 70 of core 66 that projects up into the hollow interior of hollow cylindrical element 56 is provided with a spiral groove 72 into which is wound resistance wire 74. This wire enters cavity 64 through longitudinal slot 76 in the threaded section of plug 50, is coiled upwardly along the spiral groove 72 to the top of the core where it passes into the hollow interior thereof through radial opening 78 and back down the inside before emerging once again through yet another plug 80.

As seen in FIGURE 6, the heater element 40 is preferably connected in series with a D.C. power supply (not shown) such as the 6 or 12 volt electrical system of an automobile or truck. The ignition switch 82 and a rheostat 84 which can be used to adjust the current to resistance wire 74. While it is not essential that the current passing through the heater element be varied, somewhat improved performance results if this can be done because the temperature of the heater element can be raised or lowered as required to match conditions of increased or decreased fuel consumption, thereby maintaining the temperature of the hot fuel vapors somewhat constant while, at the same time, insuring complete vaporization thereof.

The temperature developed inside the prime heater 26 have not, as yet, been precisely determined; however, they are known to be well in excess of the boiling points of even the higher boiling-point gasoline and distillate fractions and the best estimates place them around 800 to 1500° F. and above. A current of between approximately 2 and 5 amperes is required to operate the resistance heating element 40 depending upon the rheostat setting. In operation, the external visible surfaces of the prime heater housing are quite hot and even glow to a perceptible degree. The hot vapors discharged from the prime heater into the venturi of the carburetor issue forth in the form of a fog or mist made up of extremely small droplets that demonstrate little or no propensity to condense out on the cooler venturi walls before being swept on into the engine with the fast-flowing stream of combustion air passing therethrough. The fact that more complete combustion of the fuel is taking place appears self-evident from the substantially increased mileage-gallon of fuel resulting from use of the unit in comparison tests run over the same course with and without the unit on the same vehicle and under substantially identical operating conditions.

Finally, reference will be made to FIGURE 7 wherein an alternative form of the fuel vaporizer or heater has been shown and broadly identified by reference numeral 10m. Raw fuel delivery tube 28 and the large bore vapor discharge tube 42 remain the same as in the previously-described embodiment, as does the head 32; however, the heat-exchange housing 34m has been modified slightly to include a side-opening gas-discharge port 86 adjacent the top of the heat-exchanger element 26m that has been altered to use the hot exhaust manifold gases as a source of heat rather than an electrical resistance heating element as will be explained in detail presently. The helicoidal fin 60 is unchanged and the hollow cylindrical member 56m upon which it is mounted or formed as an integral part thereof is changed in two minor respects, namely, to make it longer so that it extends all the way through plug 36m onto the exterior of the unit and, secondly, to provide it with an internally-threaded gas-discharge port 88 near the top thereof in coaxial transverse alignment with the like port 86 in the housing 34m. Plug 36m is simplified to include only a single axial bore 90 analogous to the counterbore 54 of the previously-described version in that it is sized to tightly seal around the outside of cylindrical member 56m.

Screwed into the gas discharge port 88 of member 56m so as to emerge through and fit snugly inside port 88 of the heat-exchanger housing 34m is a pipe 92. Thus, the heat-exchanger has physically independent flow paths for the engine fuel and the gaseous products of combustion taken from the exhaust manifold 94, these separate flow paths being arranged in concentric counter current flow heat-exchange relation to one another.

The exhaust manifold 94 has an opening 96 in the wall thereof into which a gas-intake tube 98 with a right-angle bend 100 and a flared scoop-like end 102 is inserted so as to face upstream and receive the hot products of combustion passing through the manifold in the direction of arrow A. This gas-intake tube bleeds off a portion of the hot gaseous combustion products at a point preferably approximately midstream and delivers same into the interior of prime heater 10m through tubular member 56m to which it is connected by coupling 104. These hot gases passing up through tubular member 56m transfer a substantial portion of their heat to the walls thereof and to the helicoidal fin 60 surrounding same and the latter element, in turn, vaporizes the fuel spiralling down through annular chamber 62 before discharging same as a hot vapor back into the carburetor venturi or cylinder directly. The hot combustion gases, of course, cool to the extent of the heat transferred to the fuel and, thus cooled, they are returned to the exhaust manifold upstream of intake end 102 by means of cool gas return conduit 106 that connects onto pipe 92 and enters the exhaust manifold through opening 108 in the wall thereof. The end of conduit 106 has a right-angle bend 110 that directs the discharged gases downstream preferably displaced laterally from the intake end of tube 98 so as to not obstruct the flow of hot gases therein or cycle a significant proportion of cool gas thereto. As the exhaust gases from the engine flow past the end of conduit 106, they establish a slight vacuum at the tip which differential pressure between the intake and discharge is sufficient to suck the cool gases therefrom and insure continuous circulation of combustion gases through the system.

Now, the embodiment of FIGURE 7 is totally dependent upon the temperature of the products of combustion moving through the exhaust manifold which are nowhere near as hot as the temperatures that can be developed by the electrically-energized resistance heating element of the previously-described embodiment. Even so, it is felt that temperatures of 400 to 600° F. and above can be achieved in this fashion which are sufficient to bring about substantially complete fuel vaporization and much improved overall efficiency compared with engines equipped with conventional carburetion systems.

Having thus described the several useful and novel features of the fuel vaporizer for internal combustion engines of the instant invention, it will be seen that the several worthwhile objectives for which it was developed have been achieved. Although only two specific embodiments have been illustrated, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. The heater for vaporizing volatile liquid fuels preparatory to burning same in an internal combustion engine which comprises: inner and outer hollow cylindrical members arranged in vertically-disposed coaxial relation to define an annular fuel-flow space therebetween, said outer cylindrical member having a liquid fuel inlet communicating the fuel-flow space at the upper end thereof and a vaporized fuel outlet adjacent its lower end, said inner cylindrical member being fabricated from a heat-conductive material, means carried by the outer hollow cylindrical member isolating the fuel-flow space from the atmosphere, means carried by the inner hollow cylindrical member isolating the interior thereof from the fuel-flow space, a helicoidal fin formed from heat-conductive material fastened to the exterior cylindrical surface of the inner hollow cylindrical element so as to substantially bridge the annular fuel-flow space left between the inner and outer hollow cylindrical members while extending from the inlet to the outlet of the latter, heat-transfer means inside the hollow interior of the inner cylindrical member operative to continuously heat the latter and the fin carried thereby to a temperature sufficient to completely vaporize volatile liquid fuel gravitating spirally within the fuel-flow space, means connected to the liquid fuel inlet connectable to a source of liquid fuel, a carburetor including a venturi section in the inlet throat thereof, and means connected to the vaporized fuel outlet opening into and connecting the venturi section of the carburetor which is connectable to an internal combustion engine for supplying hot vaporized fuel thereto immediately prior to combustion.

2. The heater for vaporizing volatile liquid engine fuels as set forth in claim 1 in which: the means connected into the liquid fuel inlet comprises a tubular preheater located in heat-exchange relation to the hot fuel vapors discharged from the fuel-flow space through the means connected to the vaporized fuel outlet.

3. The heater for vaporizing volatile liquid engine fuels as set forth in claim 1 in which: the heat-transfer means comprises an electrically-energized resistance heating element sealed inside the hollow interior of the inner cylindrical element.

4. The heater for vaporizing volatile liquid engine fuels as set forth in claim 1 in which: the heat-transfer means comprises hot gaseous products of combustion bled off the exhaust manifold of the internal combustion engine and passed continuously through the hollow interior of the inner cylindrical element in counter current heat-exchange relation to the fuel gravitating in spiral fashion down the exterior surface thereof.

5. The heater for vaporizing volatile liquid engine fuels as set forth in claim 1 in which: the means for isolating the fuel-flow space from the atmosphere comprises a cap fastened to the upper end of the outer cylindrical member and a plug bridging the opposed cylindrical surfaces of said inner and outer cylindrical members below the vaporized fuel outlet in the latter.

6. The heater for vaporizing volatile liquid engine fuels as set forth in claim 1 in which: the means for isolating the interior of the inner cylindrical member from the fuel-flow space surrounding same comprises a cap fastened to the upper end of said inner cylindrical member and a plug in the lower end thereof.

7. The heater for vaporizing volatile liquid engine fuels as set forth in claim 1 in which: the inner and outer cylindrical members have aligned exhaust ports in the upper ends thereof, and in which the means for isolating the interior of the inner cylindrical element from the fuel-flow space surrounding same comprises an exhaust tube connected between said aligned exhaust ports and a hot gas intake tube connected into the lower end of said inner cylindrical element.

8. The heater for vaporizing volatile liquid engine fuels as set forth in claim 1 in which: the means for isolating the interior of the inner cylindrical element from the fuel-flow space surrounding same comprises a closed hot gas circulation system including the exhaust manifold of the internal combustion engine, first conduit means connected to bleed hot gaseous products of combustion from said exhaust manifold and deliver same to the lower end of the inner cylindrical member, and second conduit means connected to receive the gaseous products of combustion from the upper end of said inner cylindrical element and return same to said manifold.

9. The heater for vaporizing volatile liquid engine fuels as set forth in claim 2 in which: the preheater comprises a liquid fuel delivery tube passing through the barrel of an internal combustion engine carburetor adjacent the throat of the venturi, and the means connected to the vaporized fuel outlet comprises a tube connected to return the fuel in vaporized form to said carburetor venturi adjacent said liquid fuel delivery tube.

10. The heater for vaporizing volatile liquid engine fuels as set forth in claim 3 in which: the resistance heating element comprises an elongate tubular ceramic core adapted to fit up inside the inner hollow cylindrical element, and a resistance wire connectable to a source of electrical energy coiled around the outside surface of said core.

11. The heater for vaporizing volatile liquid engine fuels as set forth in claim 5 in which: the cap fastened to the top of the outer hollow cylindrical member has a fuel intake passage interconnecting the fuel-flow space and the liquid fuel inlet.

12. The heater for vaporizing volatile liquid engine fuels as set forth in claim 6 in which: an electrically-operated resistance heating element carried by the plug is sealed within the inner hollow cylindrical member.

13. The heater for vaporizing volatile liquid engine fuels as set forth in claim 8 in which: the first conduit means has the intake end thereof mounted inside the exhaust manifold facing upstream, and the second conduit means has its outlet end connected inside said exhaust manifold upstream of said intake end of the first conduit means and facing downstream.

14. The heater for vaporizing volatile liquid engine fuels as set forth in claim 10 in which: the electrical circuit energizing the resistance heating element includes a switch and a rheostat connected in series with the heating coil.

15. The heater for vaporizing volatile liquid engine fuels as set forth in claim 13 in which: the intake end of the first conduit means and the outlet end of the second conduit means are displaced from one another laterally so that a relatively small proportion of the cool exhaust gases leaving the latter enter the former.

References Cited

UNITED STATES PATENTS

| | | |
|---|---|---|
| 1,542,823 | 6/1925 | Manville. |
| 1,610,000 | 12/1926 | Fay. |
| 1,931,379 | 10/1933 | Graziano. |
| 2,793,633 | 5/1957 | Heftler et al. _____ 123—122 |

LAURENCE M. GOODRIDGE, Primary Examiner

U.S. Cl. X.R.

219—207; 261—142